United States Patent [19]
Fukami

[11] Patent Number: 5,276,561
[45] Date of Patent: Jan. 4, 1994

[54] APPARATUS FOR REPRODUCING DIGITAL SIGNAL

[75] Inventor: Tadashi Fukami, Kanagawa, Japan

[73] Assignee: Sony Corporation, Tokyo, Japan

[21] Appl. No.: 1,227

[22] Filed: Jan. 6, 1993

Related U.S. Application Data

[63] Continuation of Ser. No. 556,474, Jul. 24, 1990, abandoned.

[30] Foreign Application Priority Data

Jul. 28, 1989 [JP] Japan .................. 1-196411

[51] Int. Cl.$^5$ .................. G11B 5/09; G11B 15/14
[52] U.S. Cl. .................. 360/32; 360/49; 360/64
[58] Field of Search .................. 360/32, 49, 72.2, 53, 360/61, 64

[56] References Cited

U.S. PATENT DOCUMENTS

| | | | |
|---|---|---|---|
| 4,696,008 | 9/1987 | Takei et al. | 371/47 |
| 4,799,221 | 1/1989 | Fukami et al. | 371/38 |
| 4,862,297 | 8/1989 | Fukami et al. | 360/32 |
| 4,875,111 | 10/1989 | Odaka et al. | 360/64 |
| 5,021,897 | 6/1991 | Yoshino et al. | 360/72.2 |

FOREIGN PATENT DOCUMENTS 0235782 9/1987 European Pat. Off.
0278702 8/1988 European Pat. Off.
0294841 12/1988 European Pat. Off.

*Primary Examiner*—Donald Hajec
*Assistant Examiner*—Won Tae C. Kim
*Attorney, Agent, or Firm*—Lewis H. Eslinger; Jay H. Maioli

[57] ABSTRACT

A digital signal reproducing apparatus for reproducing a digital signal from a recording medium on which a digital signal, including coded address data to identify a data block, is recorded includes a reproducing circuit for reproducing the recorded signal, a memory for storing the reproduced signal, an address extracting circuit for taking out the address data from the reproduced signal, a circuit for forming a reference address from the extracted address data, a comparator for comparing the extracted data and the reference address, and a writing circuit for selectively writing the reproduced signal into the memory in response to the output from the comparator.

9 Claims, 10 Drawing Sheets

CODE STRUCTURE OF TRACK A

CODE STRUCTURE OF TRACK B

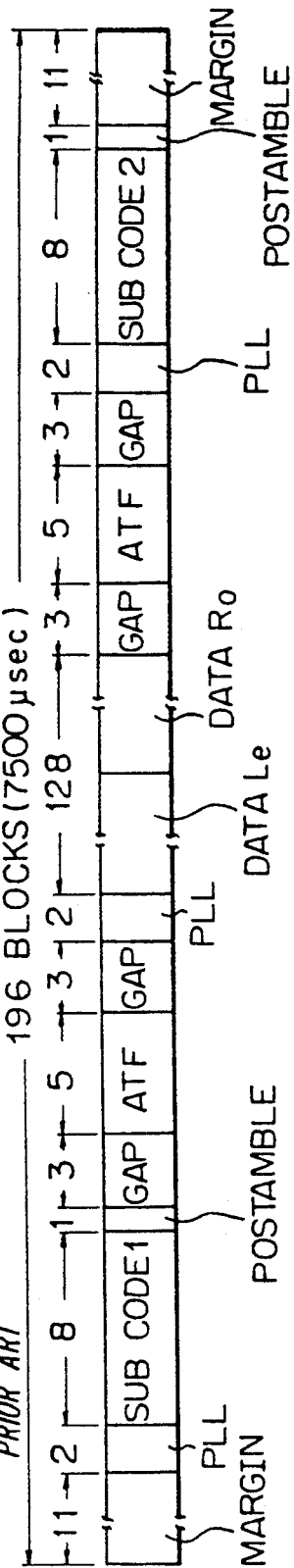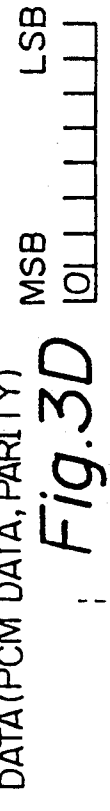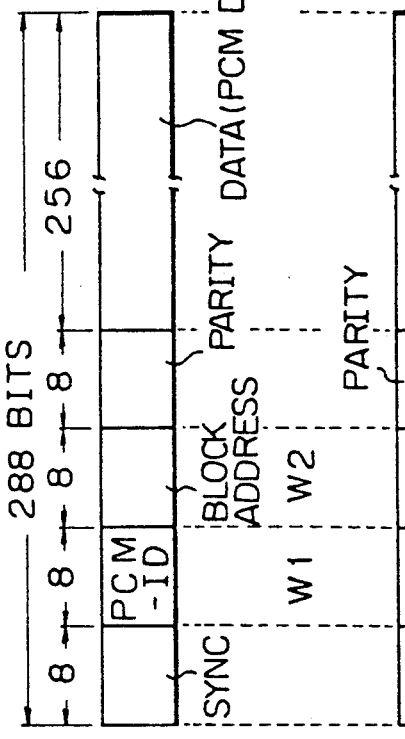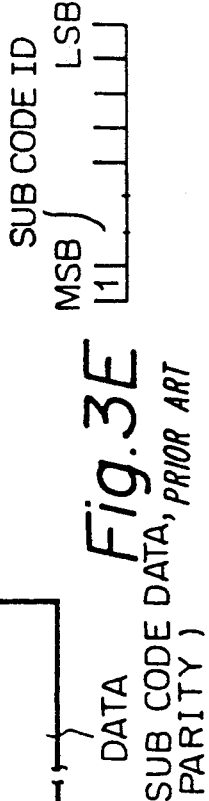

Fig. 4
PRIOR ART

| W1 (PCM-ID) | | W2 (BLOCK ADDRESS) | |
|---|---|---|---|
| ID-1 | ID-2 FRAME ADDRESS FAD | 0 X X X 0 0 0 0 | |
| OPTIONAL CODE | | 0 ↑ 0 0 1 | |
| ID-3 | ID-4 FRAME ADDRESS FAD | 0 ↑ 0 1 0 | |
| OPTIONAL CODE | | 0 ↑ 0 1 1 | |
| ID-5 | ID-6 FRAME ADDRESS FAD | 0 ↑ 1 0 0 | |
| OPTIONAL CODE | | 0 ↑ 1 0 1 | |
| ID-7 | ID-8 FRAME ADDRESS FAD | 0 ↑ 1 1 0 | |
| OPTIONAL CODE | | 0 ↑ 1 1 1 | |

MSB ... LSB | MSB ... LSB

APPARATUS FOR REPRODUCING DIGITAL SIGNAL

This is a continuation of application Ser. No. 07/556,474, filed Jul. 24, 1990, abandoned.

BACKGROUND OF THE DISCLOSURE

1. Field of the Invention

The invention relates to a digital signal reproducing apparatus and, more particularly, to a digital signal reproducing apparatus, such as a rotary-head digital audio tape recorder (R-DAT).

2. Description of the Background

In a previously proposed digital signal reproducing apparatus, for example, a rotary-head digital audio tape recorder (R-DAT), a pair of tracks formed by a pair of magnetic heads are called an interleave pair, and a kind of interleaving is performed in which two tracks constitute one frame. Frame addresses recorded on the tracks of the interleave pair have identical values, so that the interleave pair can be easily identified from their frame addresses upon playback.

It is to be noted that in the typical R-DAT apparatus a memory functioning as a buffer is provided for time-base expansion and also for performing the deinterleave operation.

Because a frame-completion type interleave is applied in the R-DAT apparatus as mentioned above, in which two tracks complete one frame, unless data having the same frame address is read into the same block of the memory, an interleave error occurs causing the error correction circuit to perform erroneous correction resulting in the reproduced sound not being smooth and continuous. To overcome these drawbacks the following techniques have been proposed:

As described in U.S. patent application Ser. No. 21,226 filed Mar. 3, 1987 proposed by the present applicant and now U.S. Pat. No. 4,799,221, all the reproduced data is read into a memory, and if it is detected that the data does not have the same frame address during the reproduction processing, erasure correction in an error correction circuit is prohibited or an interpolation operation is enforced.

As described in U.S. patent application Ser. No. 87,093 filed Aug. 19, 1987 proposed by the present applicant and now U.S. Pat. No. 4,875,111, when the reproduced data is read into the memory, a frame address derived from the reproduced signal is used as a write address for the memory so that no interleave error occurs in the memory.

Nevertheless, the following problems exist in the above-mentioned techniques, respectively. When it is detected that the data does not have the same frame address, the correction capability of the error correction circuit must be lowered or a forced interpolation must be done. In the case of the forced interpolation, this results in interpolation being carried out even when the data is correct. This is inefficient. When using a reproduced frame address as the write address for the memory, a large-capacity memory is needed, and this is disadvantageous in terms of hardware size and cost.

OBJECTS AND SUMMARY OF THE INVENTION

It is, therefore, an object of this invention to provide a digital signal reproducing apparatus capable of reading the reproduced data of the same frame address into the same block in a memory with high reliability, without lowering ECC correction capability, without performing forced interpolation, and without enlarging hardware size.

According to an aspect of the invention, there is provided a digital signal reproducing apparatus for reproducing a digital signal from a recording medium, in which the digital signal includes coded address data to identify a data block, comprising a reproducing circuit for reproducing the recorded signal from the recording medium, a memory for storing the signal reproduced by the reproducing circuit, a signal separator for separating the address data from the signal reproduced by the reproducing circuit, an address circuit for forming a reference address from the separated address data, a comparator for comparing the address data and the formed reference address, and a write circuit for selectively writing the reproduced signal into the memory in response to the output of the comparator.

The above and other objects, features, and advantages of the present invention will become readily apparent from the following detailed description thereof, which is to be read in connection with the accompanying drawings in which like reference numerals represent the same or similar elements.

BRIEF DESCRIPTION OF THE DRAWINGS

FIGS. 3A to 3E are representations useful in explaining the R-DAT tape format and block format;

FIG. 4 is a representation useful in describing R-DAT W1 and W2 data formats;

DETAILED DESCRIPTION OF PREFERRED EMBODIMENT

Figure 1:
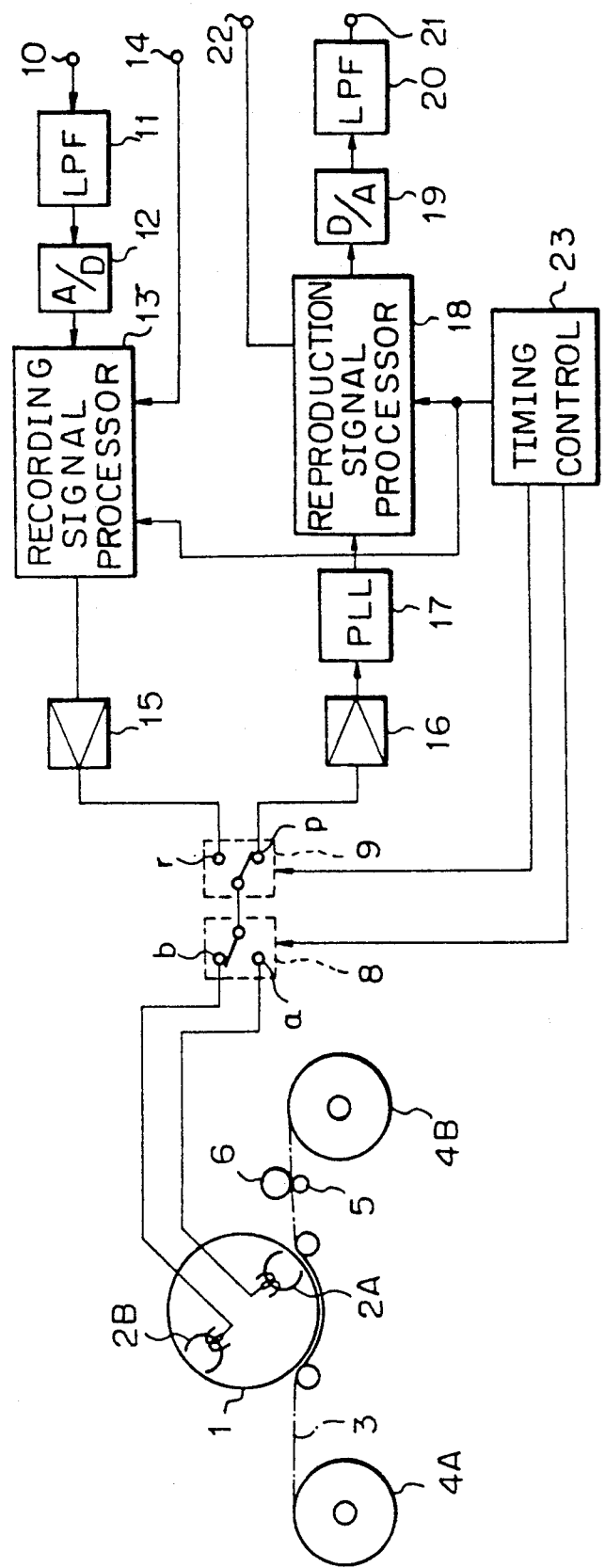
FIG. 1 is a block diagram showing a rotary-head digital audio tape recorder (R-DAT) to which an embodiment of the present invention has been applied.

FIG. 1 shows the overall structure of an R-DAT tape recorder, in which a drum 1 has a diameter of 30 mm and rotates at 2000 rpm. A pair of magnetic heads 2A and 2B are attached to drum 1 and are separated by an angular interval of 180°. A magnetic tape 3 is obliquely wound around drum 1 over a wrap angle of 90°. Magnetic tape 3 extends between reel hubs 4A and 4B of a tape cassette and is driven at a linear speed of 8.15 mm/sec by a capstan 5 and a pinch roller 6 in the well-known manner.

Figure 2:
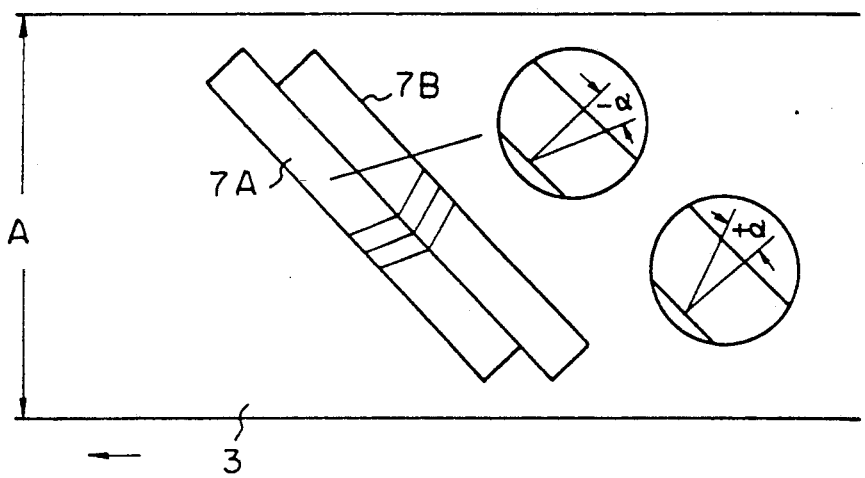
FIG. 2 is a schematic representation of an R-DAT tape recording format.

Magnetic heads 2A and 2B alternately come into contact with magnetic tape 3, so that oblique tracks 7A and 7B are formed on magnetic tape 3, as shown in FIG. 2. The tape width A of magnetic tape 3 is 3.81 mm, and the magnetic gap of one rotary head 2A is inclined by an angle $+\alpha$ with respect to a line perpendicular to the track. The magnetic gap of the other rotary head 2B is inclined by an angle by $-\alpha$ with respect to the line perpendicular to the track. In this example $a=20°$, and the angles of the magnetic gaps of magnetic heads 2A and 2B are referred to as the $+$azimuth and $-$azimuth, respectively.

Returning to FIG. 1, magnetic heads 2A and 2B are alternately selected by a head change-over switch 8. A signal to be recorded from a terminal r of a recording-/reproducing switch 9 is supplied to magnetic heads 2A and 2B through rotary transformers (not shown). Similarly, the signals being reproduced by magnetic heads 2A and 2B, and the rotary transformers, are taken out at a terminal p of recording/reproducing switch 9.

An analog audio signal fed in at an input terminal 10 is supplied to an A/D converter 12 through a low-pass filter 11 and converted into a digital audio signal, typically using a sampling frequency of 48 kHz and 16-bit linear digitization. The digital audio signal from A/D converter 12 is supplied to a recording signal processor 13 where error correction coding of the digital audio signal and the conversion into a recording format, which will be explained hereinafter, are performed. For example, an ID signal (PCM-ID) to identify the on/off state of preemphasis for the signal to be recorded, the sampling frequency, the number of digitization bits, and the like is added. In addition, the subcodes such as program number, time code, and the like of the signal to be recorded and the ID signal (subcode ID) for the subcodes are formed by a subcode encoder (not shown) and are supplied to recording signal processor 13 and fed in at a terminal 14.

The serial recording data for each track is generated by recording signal processor 13 synchronously with the rotation of magnetic heads 2A and 2B, and the recording data is supplied to head change-over switch 8 through a recording amplifier 15 and terminal r of recording/reproducing switch 9. Thus, the recording data is alternately supplied to magnetic heads 2A and 2B by head change-over switch 8.

The signals reproduced by magnetic heads 2A and 2B are supplied to a reproducing amplifier 16 through head change-over switch 8 and through terminal p of recording/reproducing switch 9. The output signal from reproducing amplifier 16 is supplied to a phase-locked loop circuit (PLL) 17. In PLL 17 the clock signals that are synchronized with the reproduction signal are extracted. The reproduced signal is then subjected to processing for error correction, interpolation, and the like in a reproduction signal processor 18. The reproduced digital audio signal is supplied to a D/A converter 19, and the analog audio signal from D/A converter 19 is fed out at an output terminal 21 after having passed through a low-pass filter 20. The subcodes and subcode ID are separated in the reproduction signal processor 18 and are fed out at an output terminal 22. A subcode decoder (not shown) is connected to output terminal 22, and the control data and the like are formed from the subcodes.

The control signals used to control head change-over switch 8 and recording/reproducing change-over switch 9 are formed by a timing control unit 23. Timing control unit 23 also generates a clock and timing signal employed by both recording signal processor 13 and reproduction signal processor 18.

The entire portion of the data that is recorded in one track is called one segment, and FIG. 3A shows an arrangement of the data of one segment which is recorded by one rotary head. It is assumed that a unit amount of the recording data is one block and 196 blocks (7500 µs) of data are included in one segment. A margin of eleven blocks is provided at both end portions of one segment corresponding to the respective ends of the track. Subcode 1 and subcode 2 are recorded adjacent the end margins, and these two subcodes consist of the same data recorded twice. The subcode includes the program number and the time code. A run-in interval of two blocks for the PLL and postamble interval of one block are arranged on both sides of a recording area of eight blocks for each subcode 1 and 2. An interlock gap in which no data is recorded is next provided and a five-block pilot signal for Automatic Track Finding (ATF) is recorded between the two interlock gaps of three blocks each. A PCM signal that has been subjected to the recording processing is recorded in an area having a length of 128 blocks that is preceded by a run-in interval for the PLL of two blocks at the center of one segment.

The PCM signal is the data corresponding to the audio signal for the period of time when magnetic heads 2A and 2B rotate one-half rotation. The PCM signal typically comprises stereophonic Pcm signals for two channels consisting of the left (L) and right (R) channels and the parity data for the error detection/correction codes. When one segment, such as shown in FIG. 3A, is recorded by magnetic head 2A, data Le is recorded in a left-half portion of the PCM signal recording area and data Ro is recorded in a right-half portion of the recording area. The data Lo consists of the even-number designated data of the L channel and the parity data concerned with that data. The data Ro consists of the odd-number designated data of the R channel and the parity data concerned with that data. The odd numbers and even numbers denote the order in which they are counted from the beginning of the interleave blocks.

Data constituting one segment having the same arrangement as that of the foregoing track is also recorded in the successive track formed by the other magnetic head 2B. Just as above, data Re is recorded in the left-half portion of the data area of the track, and data Lo is recorded in the right-half portion of the central data area. The data Re consists of the even-number designated data of the R channel and the parity data concerned with that data. The data Lo consists of the odd-number designated data of the L channel and the parity data concerned with that data. The reason why the even-number designated data and the odd-number designated data of each channel are separately recorded in two adjacent tracks and the data of the L and R channels is recorded in the same track is to prevent the continuous data of the same channel from being erroneous due to dropouts and the like.

FIG. 3B shows a data arrangement of one block of the PCM signal. A block sync signal of eight bits, constituting one symbol is added at the beginning of a block, the PCM-ID of eight bits is then added, and a block address of eight bits is added after the PCM-ID. An error correction coding process involving simple parity is performed with respect to two symbols (W1 and W2) of the PCM-ID and block address. The eight-bit parity code is added after the block address.

A data format of the PCM-ID and symbols (W1 and W2) of the block address in the above-mentioned PCM signal block is shown in FIG. 4. The PCM-ID is allotted for every other block of the PCM signal recorded in the 128 data block area of the track, that is, it is allotted for 64 blocks. The data format of the above-stated symbols (W1 and W2) is constructed of eight blocks. In FIG. 4, the PCM-ID area contains ID signals, ID-1 to ID-8, each of which has two bits, and a four-bit frame address. An optional code may be recorded in the blocks in which the ID signals and frame address are not recorded.

Identification information is defined for each of the above-mentioned ID signals ID-1 to ID-7, and one extra block is constituted by ID-8. For example, ID-1 is the format ID, and the kind of application, audio or otherwise, is identified by ID-1. In the case of audio use, ID-1=00 is selected. The contents such as the presence or absence of emphasis, the sampling frequency, the number of channels, the number of digitization, the track width, the permission or inhibition to copy, and the like are recorded on ID-2 to ID-7 after they are encoded. The foregoing ID-1 to ID-7 and the frame address have the same data in the respective segments of the interleave pair.

As shown in FIG. 3D, the block address is made up of seven bits, excluding the most significant bit (MSB). By setting the most significant bit of the block address to "0", it is indicated that the block includes the digital data, that is, the PCM data. The block address of seven bits sequentially changes, such as from (00) to (7F), using hexadecimal notation.

As shown in FIG. 4, the PCM-ID that is recorded in each block having the block address whose lower three bits are (000) (010) (100) (110) is determined as described above. The optional PCM-ID code can be recorded in each block having a block address whose lower three bits are (001) (011) (101) (111).

FIG. 3C shows a data arrangement of one block of the subcodes, and the data constitution is similar to that of the foregoing digital signal block. In FIG. 3E, the most significant bit of the symbol W2 of the subcode block is set to "1", thereby indicating that the block is the subcode block. The lower four bits of the symbol W2 are used as the block address. Eight bits of the symbol W1 and three bits in the symbol W2, except the MSB and the block address, are used as the subcode ID. The error correction coding process of simple parity is executed with regard to the two symbols (W1 and W2) of the subcode block and an eight-bit parity code is added.

The subcode ID data that is recorded in the even number designated block address, in which the least bit (LSB) of the block address is "0", differs from the subcode ID data that is recorded in the odd-number designated block address, because the LSB of that block address is "1". The subcode ID includes the control ID to designate the reproducing method, the time code, and the like. The subcode data is subjected to error correction coding processing using the Reed-Solomon code similar to the digital signal data.

Figure 5A:
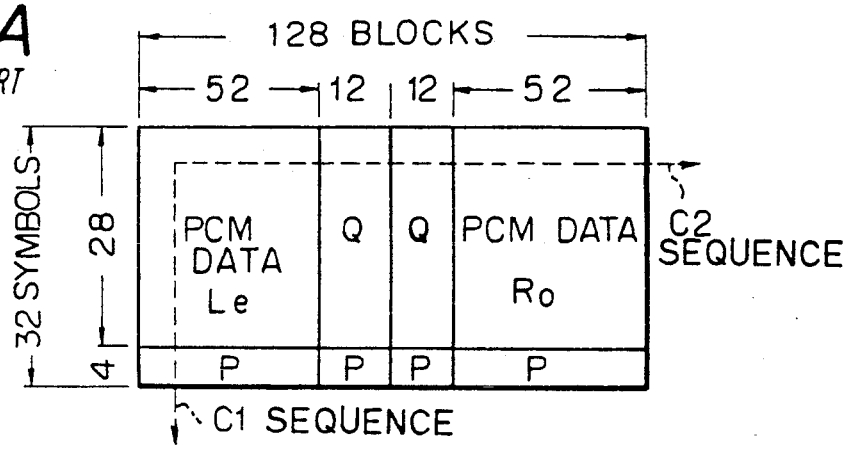
FIGS. 5A and 5B are representations useful in explaining R-DAT error correction codes.
Figure 5B:
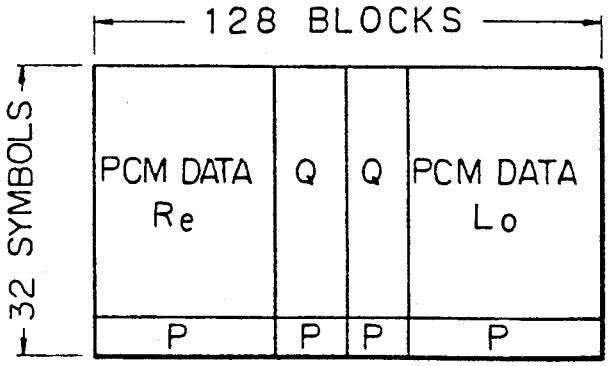

The processes for the error detection/correction codes are executed on all of the data in the 128 blocks that are recorded in one segment. FIG. 5A shows a code constitution of the data that is recorded by one magnetic head, head 2A for example, and FIG. 5B shows a code constitution of the data that is recorded by the other magnetic head 2B. The PCM signal having 16 digitization bits is divided into upper eight bits and lower eight bits and subjected to the coding processing of the error detection/correction codes, in which eight bits are used as one symbol.

Data of $(128 \times 32 = 4096$ symbols) is recorded in one segment. As shown in FIG. 5A, the coding processes of an error detection code C1 and an error correction code C2 are executed with respect to each of the column and row directions of the two-dimensional arrangement of the data comprising the even-number designated data Le of the L channel consisting of the symbols of (L0, L2, ..., L1438) and the odd-number designated data Ro of the R channel of (R1, R3, ..., R1439).

The twenty-eight symbols in the column direction are subjected to a C1 coding process using a (32, 28, 5) Reed-Solomon code. A parity data P of four symbols of the C1 code is arranged at the last position of the two-dimensional arrangement. On the other hand, the fifty-two symbols in the row direction are subjected to a C2 coding processing using a (32, 26, 7) Reed-Solomon code. The C2 code is executed with respect to the twenty-six symbols of every two symbols among the fifty-two symbols. A parity data Q consisting of six symbols is generated with respect to new code series, and parity data Q consisting of a total of twelve symbols of the C2 code is arranged in the central portion of the two-dimensional arrangement. A similar coding processing of the C2 code is performed with regard to the other fifty-two symbols of the digital signal data arranged in the row direction. The parity data Q is arranged in the central portion of the two-dimensional arrangement.

The code construction of FIG. 5B is that which is obtained by replacing the even-number designated PCM signals of the L channel in the code constitution of FIG. 5A by even-number designated PCM signals (R0, R2, ..., R1438) of the R channel and by replacing the odd-number designated PCM signals of the R channel by the odd-number designated PCM signals (L1, L3, ..., L1439) of the L channel.

One digital signal block is made up by adding the sync signal, PCM-ID, block address, and parity to the thirty two symbols arranged in the column direction in the code arrangement shown in FIG. 3B.

Figure 6:
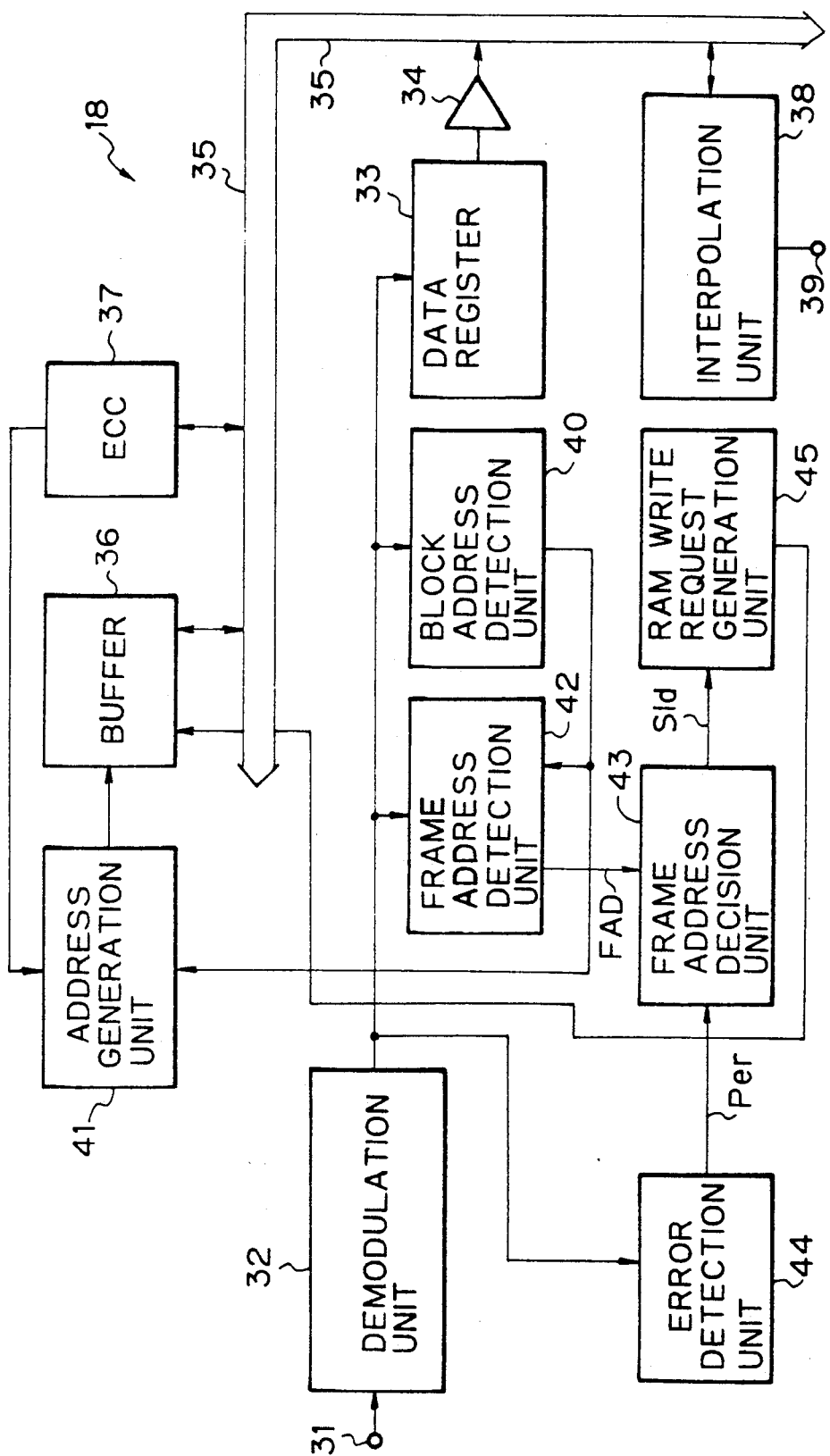
FIG. 6 is a block diagram of a reproduction signal processor according to an embodiment of the present invention.

The present invention is applied to the selection of the reproduction signal in the reproduction signal processor 18 of the R-DAT described above, and FIG. 6 shows one construction of reproduction signal processor 18. In FIG. 6, the reproduced signal is supplied to a demodulation unit 32 through an input terminal 31. One symbol of ten bits is demodulated into one symbol of eight bits. The reproduced data from demodulation unit 32 is supplied to a data bus 35 through a data register 33 and a buffer 34.

A buffer 36, which can comprise a random access memory (RAM), and an error correction circuit (ECC) 37 are also connected to data bus 35. When a write request signal is sent from a RAM write request generation unit 45, which will be described later, to buffer RAM 36 the reproduced data is sent over data bus 35 and stored in buffer RAM 36.

The data stored in the buffer RAM 36 is subjected to the error correcting processes (C1 and C2 decoding) using the Reed-Solomon code by error correction circuit 37. The error corrected PCM data is supplied to an interpolation unit 38 and the uncorrectable errors are interpolated. Then, the reproduced and error-corrected PCM data is fed out at an output terminal 39 and supplied to a D/A converter, such as shown at 19 in FIG. 1. In addition, the subcodes are subjected to further processing, such as error correction and the like, by a subcode decoder (not shown) and fed to an output terminal for the subcodes.

A block address detection unit 40 is provided with the output of demodulation unit 32 and the reproduction block address is detected. The reproduction block address as detected by block address detection unit 40 is supplied to a frame address detection unit 42 and an address generation unit 41.

The reproduction address generated by address generation unit 41 is used as an address signal for buffer RAM 36. The reproduction block address is used to write the reproduction data (23 symbols × 128 blocks), as shown in FIG. 5, of one segment every block in accordance with the order from the first block to the 128th block. An address for error correction circuit (ECC) 37 is also generated by address generation unit 41 and the address for ECC 37 is supplied to buffer RAM 36. The ECC address is used to read out the data from buffer RAM 36 for the respective C1 and C2 decoding and to write the error corrected data and a pointer back into buffer RAM 36.

Upon C1 decoding, the data that is the PCM data and the parity data of the C1 series that had previously been written by the reproduction address is read out of buffer RAM 36 every block and error corrected by error correction circuit 37. The corrected PCM data and the C1 pointer are written into the same block address in buffer RAM 36. The C1 pointer is written into the memory area in which the parity P has already been written. The error correcting process is performed with respect to all of the C1 series.

Upon C2 decoding, the C1 decoded digital signal data, C1 pointer, and parity data Q are read every C2 series and subjected to the C2 decoding in error correction circuit 37. The C2 decoding comprises one symbol or two-symbol correction using the error correction code C2 and erasure correction using the C1 pointer. The PCM signal that was error corrected by the C2 decoding and the C2 pointer is written into buffer RAM 36. In this C2 decoding, the necessary read address and write address are formed by the address generation unit 41.

The PCM data which have been subjected to the C1 and C2 decoding are read out of buffer RAM 36 in accordance with the original order. In this case, stereophonic signals of two channels are formed by the PCM data that have been reproduced from tracks TA and TB of the interleave pair and that have been error-corrected.

To read out digital signal data that has undergone error correction from buffer RAM 36, an address formed at address generation unit 41 is provided to buffer RAM 36, and digital signal data read out of buffer RAM 36 is supplied to interpolation unit 38.

In frame address detection unit 42, a frame address FAD is detected from the PCM-ID of the reproduction data provided by demodulation unit 32 based on a block address detected by the above-mentioned block address detection unit 40. More specifically, the block address (W2) varies sequentially from (06) to (7F), however, because the distinction between the ID signal and frame address FAD and an optional code can be done by the least significant bit BO of the block address, the detection of the frame address FAd is performed consequently. Thus, the detected frame address FAD is supplied to a frame address decision unit 43.

Further, the PCM-ID or subcode ID (W1), the block address (W2), and a parity, which are provided by demodulation unit 32, are supplied to an error detection unit 44. In error detection unit 44, the error detection is carried out using a simple parity. An error pulse Per indicative of the presence or absence of an error is produced by error detection unit 44 and fed to frame address decision unit 43.

Frame address decision unit 43 is constructed to supply a decision signal Sid based on the above-mentioned frame address FAd and the error pulse Per to a RAM write-request generation unit 45. RAM write-request generation unit 45 is constructed so that a write request signal is provided to buffer RAM 36 when the above-described decision signal Sid takes a high level, for example. Thus, when a write request signal having a high level is supplied to buffer RAM 36, reproduced data from demodulation unit 32 is written into buffer RAM 36.

Figure 7:
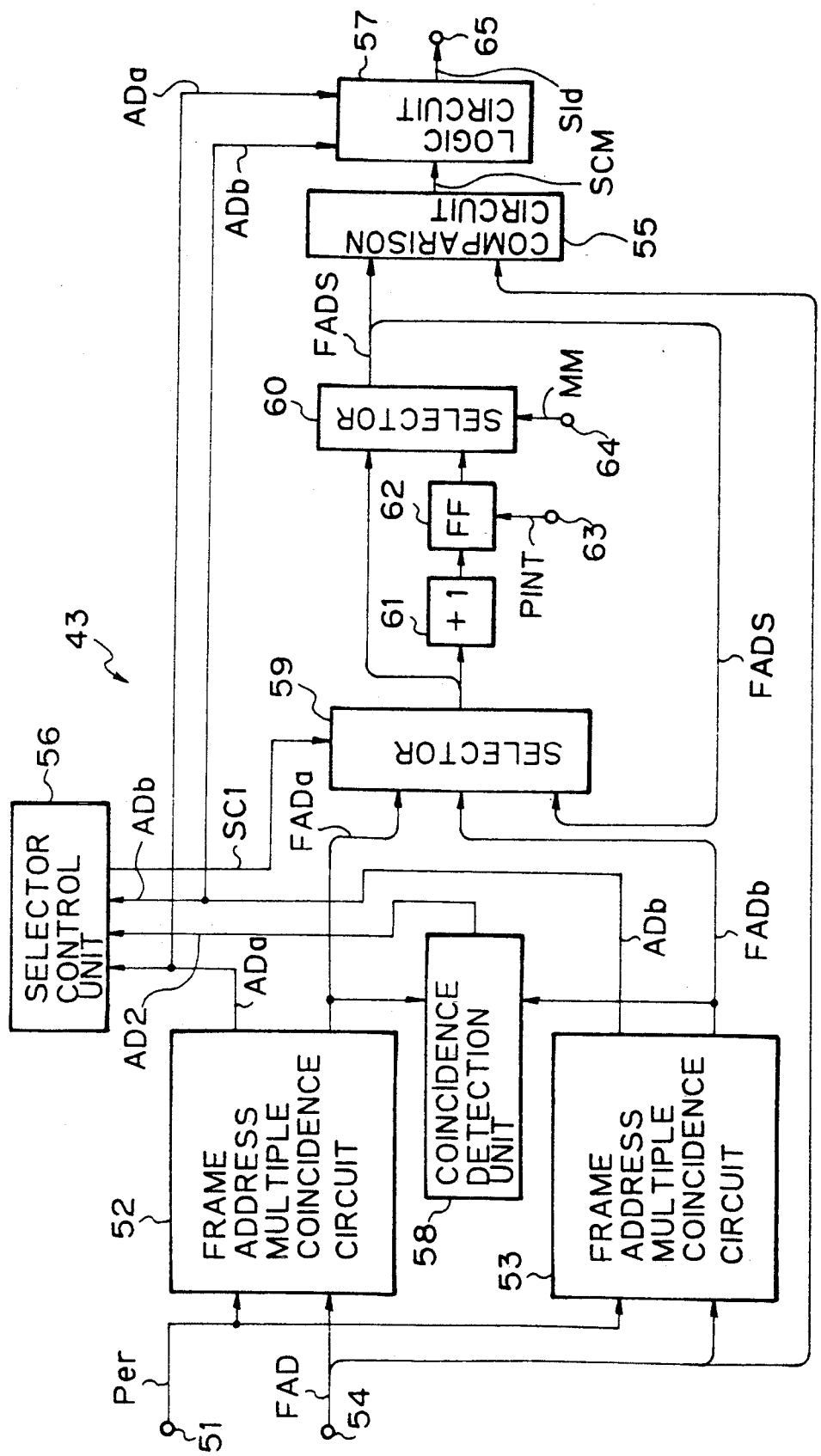
FIG. 7 is a block diagram of a frame address decision circuit according to an embodiment of the present invention.

FIG. 7 shows one embodiment of frame address decision circuit 43. In the circuit of FIG. 7, the result of the parity check is supplied as the error pulse Per through input terminal 51 to an A-channel frame address multiple coincidence circuit 52 and a B-channel frame address multiple coincidence circuit 53. In this embodiment, the A-channel multiple coincidence circuit 52 detects multiple coincidence of frame addresses of reproduction data reproduced by magnetic head 2A, while the B-channel multiple coincidence circuit 53 detects multiple coincidence of frame addresses of reproduction data reproduced by magnetic head 2B.

The error pulse Per fed in at input terminal 51 takes a high level in the presence of an error, whereas it has a low level in the absence of an error. In A-channel multiple coincidence circuit 52 and B-channel multiple coincidence circuit 53, the detection operation of multiple coincidence of the frame address FAD is performed only when the error pulse Per assumes a low level.

The frame address FAD is supplied through an input terminal 54 to A-channel multiple coincidence circuit 52, B-channel multiple coincidence circuit 53, and a comparison circuit 55.

A multiple coincidence signal ADa indicative of a result of multiple coincidence of a frame address FADA in the A channel is output from A-channel multiple coincidence circuit 52, while a multiple coincidence signal ADb indicative of a result of multiple coincidence of a frame address FADB in the B channel is produced from B-channel multiple coincidence circuit 53.

The multiple coincidence signals ADa and ADb are supplied to a selector control unit 56, a logic circuit 57, and the respective frame addresses FADA and FADb of the A channel and the B channel are fed to an AB coincidence detection unit 58 and to a selector 59.

AB coincidence detection unit 58 detects whether the frame addresses FADa and FADb detected by multiple coincidence in each of the A channel and the B channel coincide with each other, and an AB coincidence detection signal AD2 indicative of a coincidence detection result is produced and fed to selector control unit 56. At selector control unit 56, a control signal SC1 for selecting any one of the frame addresses FADa, FADb and a reference frame address FAns is developed on the basis of the multiple coincidence signals ADa, ADb and the AB coincidence detection signals AD2 and a decision rule of the reference frame address, which will be described later.

The above-described frame addresses FADa, FADb and the reference frame address FADs of the previous frame as selected by a second selector 60 are supplied to the first selector 59. In selector 59, a frame address is selected on the basis of the control signal SC1 from selector control unit 56 and SC1 from selector control unit 56 and supplied to a (+1) circuit 61 and to selector 60.

In (+1),circuit 61, the frame address FAD as a code signal, which is supplied from selector 59 and sequentially changes from (0000) to (1111), is incremented by one and fed to a D flip-flop 62.

In D flip-flop 62, the frame address FAD supplied from (+1) circuit 61 is accepted in response to a pulse PINT with an interleave period and acting as a clock pulse fed in at an input terminal 63, and the address FAD is fed out from D flip-flop 62 to selector 60.

In selector 60, one or the other of the frame address FAD from selector 59 or the frame address FAD from D flip-flop 62 is selected based on a mechanical mode signal MM supplied at an input terminal 64 and the selected frame address is supplied to a comparison circuit 55 and to selector 59, respectively, as the reference frame address FADS.

In comparison circuit 55 the reference frame address FADs is compared with the reproduced frame address FAD fed in at terminal 54. When both address values are equal, a signal SCM having a high level, for example, is fed to logic circuit 57, whereas when the address values are not equal a low-level signal SCM is fed to logic circuit 57.

Logic circuit 57 can determine the timing of the reference frame address FADs on the basis of the above-mentioned multiple coincidence signals ADa and ADb. When signal SCM assumes a high level, a high-level decision signal Sid is supplied through an output terminal 65 to RAM write-request generation unit 45 based on the timing to write the reproduction data into buffer RAM 36.

Figure 8:
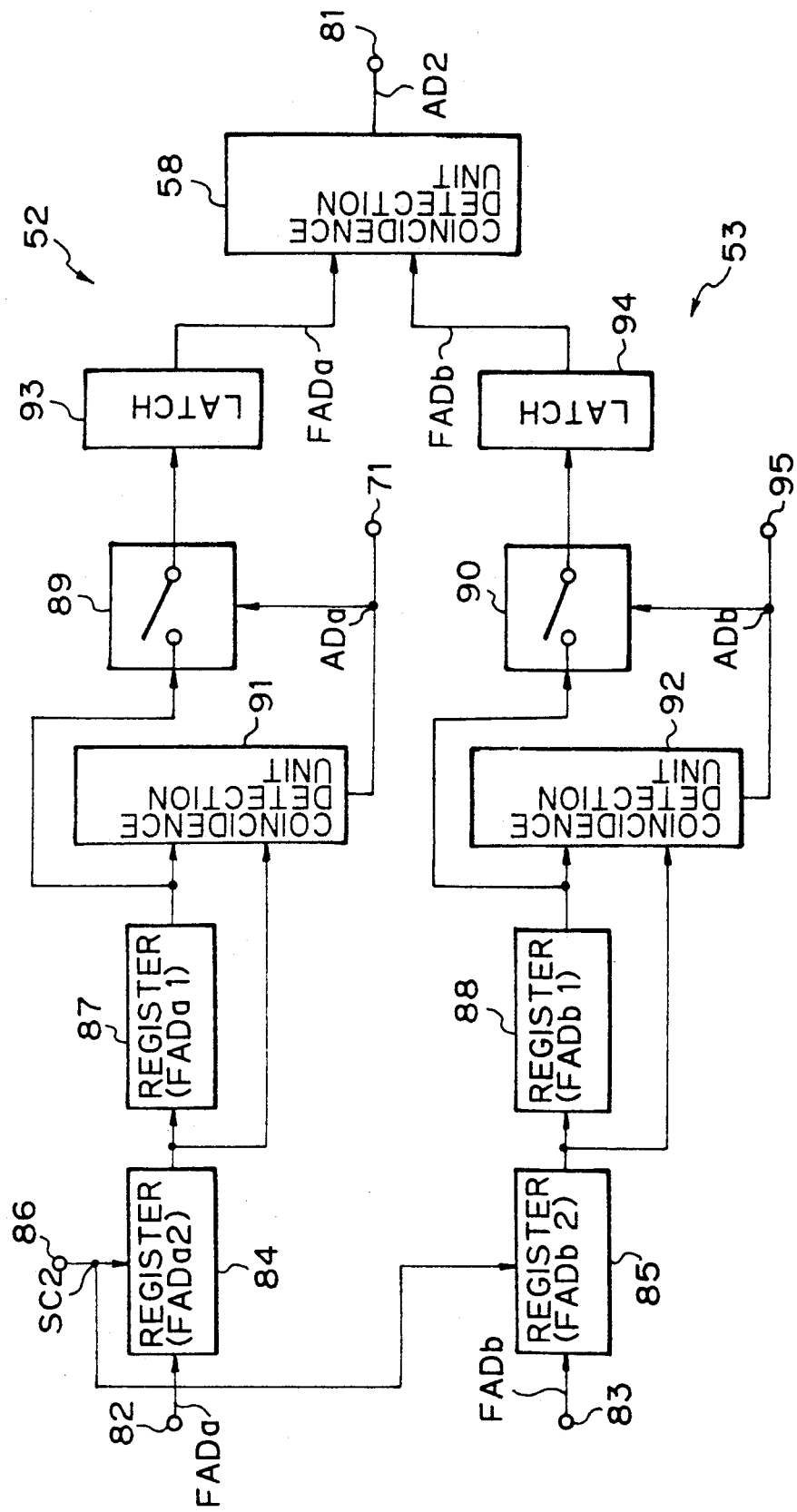
FIG. 8 is a block diagram of a frame address multiple coincidence detector and an A-B channel coincidence detector according to an embodiment of the present invention.

FIG. 8 is a block diagram of an embodiment of a circuit suitable for A-channel multiple coincidence circuit 52, B-channel multiple coincidence circuit 53, and AB coincidence detection unit 58.

A-channel multiple coincidence circuit 52 detects whether the reproduced frame address FADa of the A channel is in the state of multiple coincidence. Because the structure and operation of the B-channel multiple coincidence circuit 53 are made to be the same as those of the A-channel multiple coincidence circuit 52, only the A-channel multiple coincidence circuit 52 will be described.

The reproduced frame address FADa from the A channel is fed in at an input terminal 82 in FIG. 8 and supplied to a register 84. Meanwhile, when the error pulse Per produced from the error detector 44 has a low level, that is, when no error is detected, a high-level input control signal SC2 is fed to register 84 through a terminal 86 from a control circuit (not shown) for controlling register 84.

In register 84, only when the high-level input control signal SC2 is present is the frame address FADa1 produced. At the occurrence of the next input control signal SC2, the first frame address FADa1 is fed into a second register 87, and the next frame address FADa2 is fed into register 84. The frame address FADa1 is fed from register 87 to an input terminal of a switch 89, and the frame addresses FADa1 and FADa2 held in registers 84 and 87 are both supplied to a coincidence detection unit 91. Coincidence detection unit 91 compares the consecutive frame addresses FADa1 and FADa2 and only when it is determined that both values are equal is a high-level multiple coincidence signal ADa supplied to control the operation switch circuit 89. This coincidence signal ADa is made available at output terminal 71.

In response to the high-level multiple coincidence signal ADa, switch circuit 89 is set to an ON or closed state, so that the frame address FADa1 from register 87 is supplied to the AB coincidence detection unit 58 via switch 89 and a latch 93. Further, when the multiple coincidence signal ADa is at a low level because the values of the frame addresses FADa1 and FADa2 are not equal, switch 89 is set in an OFF or open state. As a result, the frame address FADa1 from the register 87 is not output so that only the multiple coincidence signal ADa having a low level is fed out at terminal 71.

The structure of the B-channel multiple coincidence circuit 53 is the same as the A-channel multiple coincidence circuit 52 and is composed of registers 85, 88, a coincidence detector 92, a switch 90, a latch 94, input terminal 83, and output terminal 95, and its operation is the same as the A-channel multiple coincidence circuit 52.

The frame addresses FADa and FADb are output from the latches 93 and 94 and fed to AB coincidence detection unit 58. AB coincidence detection unit 58 detects whether the frame addresses FADA and FADB reproduced respectively from the A channel and B channel coincide with each other, and an AB coincidence detection signal AD2 indicative of the results of the coincidence detection operation is output at terminal 81. When both of the frame addresses FADa and FADb of the A-channel multiple coincidence circuit 52 and the B-channel multiple coincidence circuit 53 coincide with each other, a high-level AB coincidence detection signal AD2, for example, is supplied to the selector control unit 56 of FIG. 7 through output terminal 81.

Although the R-DAT apparatus has the feature that the drum diameter, wrap angle, number of revolutions of the drum, and the like can be varied if the track format is observed, the waveforms of the reproduced RF signals are different from one another by the conditions as shown in FIG. 10. For example, in FIG. 10A, the reproduced RF signal waveform in a Standard Playback (SP) mode at 2000 rpm with a drum diameter of 30 mm is shown; in FIG. 10B, the reproduced RF signal waveform in an A-A-A-Type SP mode is shown; in FIG. 10C, the reproduced RF signal waveform in 1.5-fold speed (increased by 1-½ times) of the A-type is shown; in FIG. 10D, the reproduced RF signal waveform in an A-type Long Playback (LP) mode is shown; in FIG. 10E, the reproduced RF signal in a B-type SP mode is shown; in FIG. 10F, the reproduced RF signal waveform in 1.5-fold speed of the B-type is shown; in FIG. 10G, the reproduced RF signal waveform in a B-type LP mode is shown; and in FIG. 10H, the reproduced RF signal waveform is shown when tape speed is doubled in the SP mode.

In the discussion of FIGS. 10A-10H, A type means that magnetic heads 2A and 2B are provided in a stepped relationship corresponding to one half of the track pitch and B type means that there is no step between the magnetic heads 2A and 2B. Also, in all cases except FIG. 10A, it is assumed that the drum diameter is 15 mm, the number of revolutions of the drum is 4000 rpm, and the wrap angle is 180°, in both the A type and the B type. In addition, the SP mode means a standard recording time mode, and the LP mode means a long time recording mode. Further in FIGS. 10A-10H A indicates a waveform of the reproduced signal of the A channel reproduced by the magnetic head 2A, and B indicates a waveform of the reproduced signal of the B channel reproduced by the magnetic head 2B. Moreover, the suffixes 05", "06" affixed to the above-mentioned A and B are the numbers of adjacent tracks or frames.

Irrespective of the above-mentioned conditions, the present invention sets the reference frame address FADs when reproduced data is taken into buffer RAM 36, and takes data into buffer RAM 36 based on whether the reproduced frame address FAD coincides with the reference frame address FADS. Thus, only reproduced data with the same frame address FAD can be taken into the same block of buffer RAM 36.

Consequently, the reproduced data with the same frame address FAD can be taken into the same block of buffer RAM 36 with high reliability, without lowering ECC correction capability, without forcing interpolation, and without increasing the hardware size. Further, since the reproduced data is written into buffer RAM 36 only when the reference frame address FADs is equal to the reproduced frame address FAD, the invention is applicable to all mechanical specifications and reproducing conditions. Also, it is possible to perform stable reproduction even in the face of tracking disturbances.

Figure 9A:
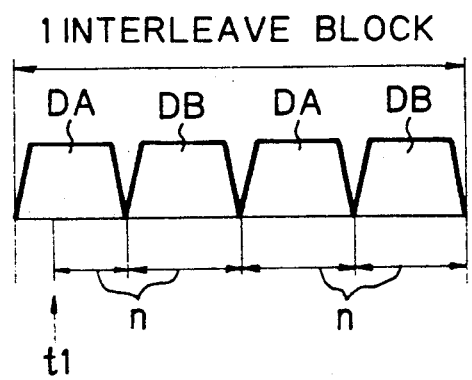
FIGS. 9A to 9C are representations useful in explaining a decisional rule of a reference frame address.
Figure 9B:
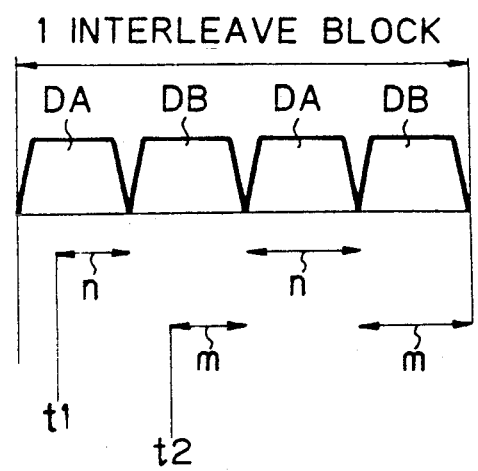
Figure 9C:
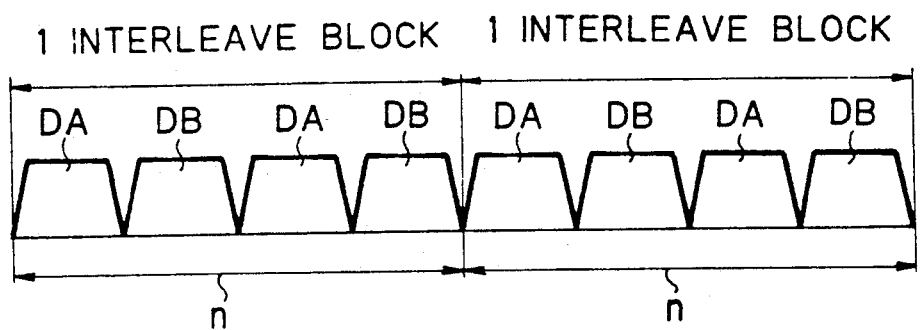
Figure 10A:
FIGS. 10A to 10H are signal diagrams showing an example of an envelope of a R-DAT reproduced RF signal.
Figure 10B:
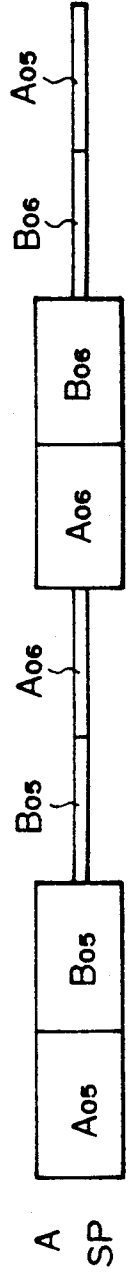
Figure 10C:
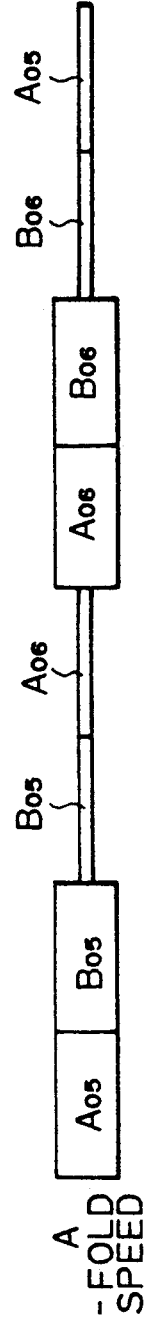
Figure 10D:
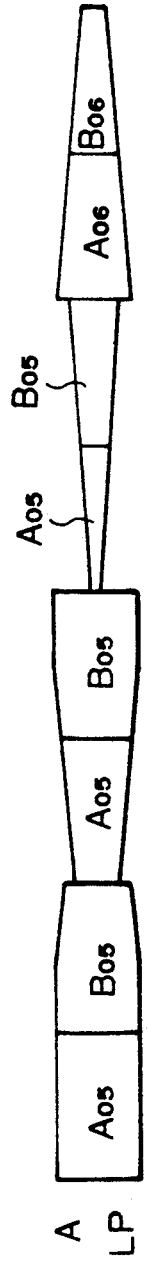
Figure 10E:
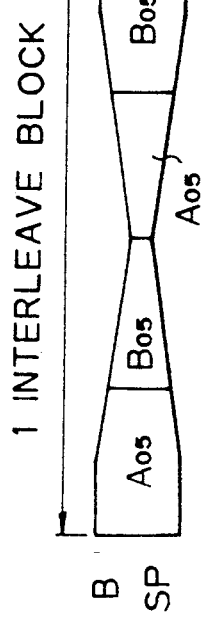
Figure 10F:
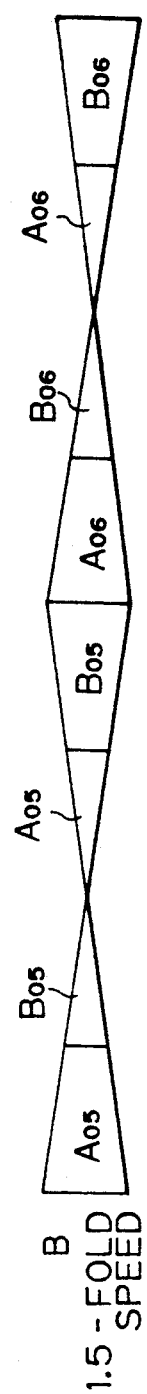
Figure 10G:
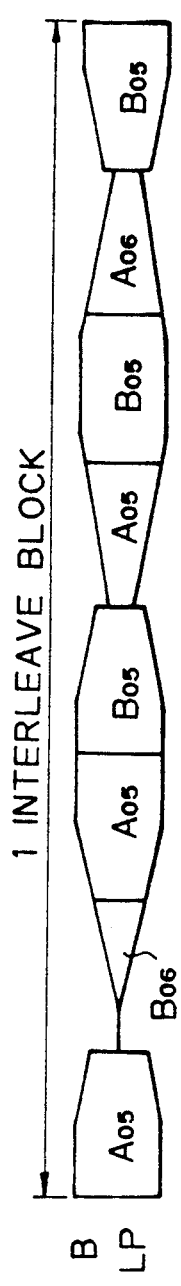
Figure 10H:
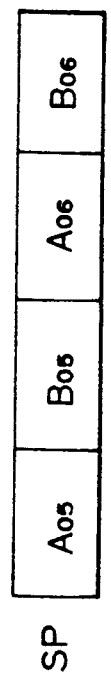

In this embodiment, the reference frame address FADs is determined with multiple coincidence of the frame address FAD, and it has the following three modes. In FIGS. 9A-9C DA and DB represent the timing of the playback signals reproduced by magnetic heads 2A and 2B, respectively.

As shown in FIG. 9A, the frame address FAD that first provides multiple coincidence within one interleave block is selected to be the reference frame address AD common with the A channel and the B channel, and subsequent frame addresses FAD are disregarded.

In this case, the reference frame address FADs is determined by the following decision rule, in which OK of the multiple coincidence signal AD represents a high level at which the multiple coincidence signal AD represents a low level at which no multiple coincidence is provided.

In selector 60 of frame address decision circuit 43 shown in FIG. 7, the frame address FAD selected by selector 59 is compared with the frame address FAD of the reproduced data in comparison circuit 55.

As shown in FIG. 9A, if the frame address FADA of the A channel provides multiple coincidence at a time point t1 and if it is assumed that its value is n, the value n of the frame address FADA is selected to be the reference frame address FADs that is common with the A and B channels within one interleave block. Here, this decision rule is applied to the cases of the reproduction of the A type SP mode of FIG. 10B, the A type LP mode of FIG. 10D and the B type SP mode of FIG. 10E, for example.

In the example illustrated in FIG. 9C, the reference frame address FADs in the present interleave block is decided to be the reference frame address in the next interleave block by the following decision rule:

In selector 60 of frame address decision circuit 43 of FIG. 7, the frame address FAD is incremented by one at the (+1) circuit 61 and fed through D flip-flop 62 and is selected by selector 60 by the mechanical mode MM for two-fold speed and compared with the frame address FAD of the reproduced data in comparator 55.

As represented in FIG. 9C and as shown in the above chart, when the multiple coincidence signals ADa and ADb of the A channel and B channel are in the states of (NG, NG), (OK, OK), the value of the reference frame address FADs in the next interleave block is n if the value of the reference frame address FADs in the present interleave block is n. Now, this decision rule is applied to the reproduction of the B type LP mode of FIG. 10G.

In the example shown in FIG. 9B, the frame address FAD that first coincides within one interleave block is selected as the reference frame address FADs for every channel in its interleave block, and subsequent frame addresses are disregarded.

In this case, the frame addresses FADA and FADB that provide multiple coincidence in each of the A and B channels are made to be the respective reference frame addresses of the A channel and the B channel within the present interleave block.

The frame address FAD selected by selector 59 of FIG. 7 is selected in selector 60 of the frame address decision circuit 43 and is compared with the frame address FAD of the reproduced data in comparison circuit 55.

As represented in FIG. 9B, when the frame address FADA of the A channel provides multiple coincidence at the time point t1 to make its value n and when at a time point t2, the frame address of the B-channel provides multiple coincidence to bring its value to be m, the above-mentioned frame address FADA, whose value is n, of the A channel is selected as the reference frame address FADs of the A channel, while the frame address FADB, whose value is m, of the B channel is made to be the reference frame address FADs of the B channel. Here, this decision rule is applied to the reproduction in the A-type variable speed mode of FIG. 10C and the B-B-type variable speed mode of FIG. 10F, both of which are for the 1.5-fold speed in the drawings.

Having described a preferred embodiment of the invention with reference to the accompanying drawings, it is to be understood that the invention is not limited to that precise embodiment and that various changes and modifications could be effected by one skilled in the art without departing from the spirit of scope of the novel concepts of the invention, as defined in the appended claims.

For example, although in the above-described embodiment, an interleave pair with the identical frame address is constituted by two tracks formed by the two magnetic heads of the A channel and B channel, there is no two track limitation, and the identical frame address may be given for three or more tracks.

According to the digital signal reproducing apparatus so this invention, reproduced address data and a reference address are compared at the time of reproduction and the reproduced digital signal is selectively written into a memory based on this comparison output. As a result, the reproduced digital signal with the identical frame address can be taken into the same block of a memory with high reliability, without lowering ECC correction capability, without enforceably performing interpolation, and without enlarging the hardware size.

Also, only when the reference frame address is equal to the reproduced frame address is writing in the memory performed. For this reason, there are effects that the invention is applicable to all mechanical specifications and reproduction conditions and stable reproduction is possible even when tracking disturbances are present.

What is claimed is:

1. A digital signal reproducing apparatus for reproducing a digital signal including address data to identify a data block from a recording medium, comprising:

reproducing means for reproducing the digital signal including the address data recorded on the recording medium;

memory means for storing the digital signal reproduced by said reproducing means;

means for extracting the address data from the reproduced digital signal;

means for forming reference address data from the extracted address data including multiple coincidence detecting means for detecting multiple, successive coincidences between successive, adjacent pairs of said extracted address data;

comparing means for comparing the extracted address data and the reference address data; and means for writing the reproduced digital signal into said memory means in response to a comparison output signal from said comparing means.

2. A digital signal reproducing apparatus according to claim 1, wherein said means for selectively writing produces a write request signal to write the reproduced digital signal into said memory means when the comparison output signal from said comparing means indicates that the extracted address data coincides with the reference address data and for not writing the reproduced digital signal into said memory when said two data are not the same.

3. A digital signal reproducing apparatus according to claim 1, wherein said recording medium comprises a magnetic tape, said address data includes frame address data, and said reproducing means includes first and second rotary heads for reproducing a digital signal recorded on said tape and wherein said multiple coincidence detecting means includes first and second frame address multiple coincidence detecting means receiving frame addresses respectively reproduced by said first and second rotary heads, and said means for forming reference address data includes selector means for selecting an output of said first and second frame address multiple coincidence detecting means and for forming the reference address data from the selected output.

4. A digital signal reproducing apparatus according to claim 3, wherein said selector means operates in response to a signal fed thereto representing a mechanical reproducing mode of the digital signal reproducing apparatus.

5. A digital signal reproducing apparatus according to claim 3, further comprising error detecting means for detecting an error of the reproduced digital signal including the frame address data, and said first and second frame address multiple coincidence detecting means are controlled in response to an output of said error detection means.

6. Digital signal reproducing apparatus having two rotary heads for reproducing from a magnetic tape a digital signal including address data to identify a data block of the digital signal, comprising:

reproducing means for reproducing the digital signal including the address data recorded on the recording medium;

means for extracting the address data from the reproduced digital signal;

means for forming reference address data from the extracted address data including multiple coincidence detecting means for detecting multiple, successive coincidences between successive, adjacent pairs of said extracted address data;

comparing means for comparing the extracted address data and the reference address data and producing a coincidence output signal when said extracted address data and said reference address data coincide and belong to the same data block;

memory means for storing as data blocks the digital signal reproduced by said reproducing means; and means for selectively writing the data blocks of the reproduced digital signal into said memory means when said coincidence output signal from said comparing means indicates coincidence between said extracted address data and said reference address data and for not writing therein when said coincidence output signal indicates no coincidence.

7. A digital signal reproducing apparatus according to claim 6, wherein said address data includes frame address data representing predetermined frame segments of the digital signal, and wherein said multiple coincidence detecting means includes first and second frame address multiple coincidence detecting means receiving frame addresses respectively reproduced by said two rotary heads, and said means for forming reference address data includes selector means for selecting an output from one or the other of said first and second frame address multiple coincidence detecting means and for forming the reference address data from the selected output.

8. A digital signal reproducing apparatus according to claim 7, wherein said selector means operates in response to a signal fed thereto representing a reproducing mode selected by a user of the digital signal reproducing apparatus.

9. A digital signal reproducing apparatus according to claim 7, further comprising error detecting means for detecting errors in the reproduced digital signal and the frame address data, and wherein said first and second frame address multiple coincidence detecting means are controlled in response to an output of said error detection means.

* * * * *